(12) United States Patent
Kaupert et al.

(10) Patent No.: US 8,563,184 B2
(45) Date of Patent: Oct. 22, 2013

(54) FUEL CELL SYSTEM AND OPERATING PROCESS

(75) Inventors: Andreas Kaupert, Esslingen (DE);
Markus Willkommen, Esslingen (DE);
Karsten Reiners, Esslingen (DE);
Valentin Notemann, Sonthofen (DE);
Jörg vom Schloss, Herzogenrath (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 236 days.

(21) Appl. No.: 12/818,489

(22) Filed: Jun. 18, 2010

(65) Prior Publication Data

US 2010/0323256 A1 Dec. 23, 2010

(30) Foreign Application Priority Data

Jun. 23, 2009 (DE) .......................... 10 2009 030 236

(51) Int. Cl.
*H01M 8/06* (2006.01)
*H01M 8/04* (2006.01)

(52) U.S. Cl.
USPC ............................ 429/423; 429/435; 429/429

(58) Field of Classification Search
None
See application file for complete search history.

(56) References Cited

U.S. PATENT DOCUMENTS

| | | | |
|---|---|---|---|
| 2004/0197617 A1 | 10/2004 | Kaupert et al. | |
| 2005/0136305 A1* | 6/2005 | Eberspach et al. | ............... 429/26 |
| 2006/0051262 A1* | 3/2006 | Park et al. | ..................... 422/198 |
| 2007/0141417 A1* | 6/2007 | Bitoh | ............................ 429/23 |
| 2008/0020247 A1 | 1/2008 | Valensa et al. | |
| 2009/0061270 A1 | 3/2009 | Tsunoda | |
| 2009/0191434 A1 | 7/2009 | Käding et al. | |
| 2009/0305097 A1* | 12/2009 | Kaupert | .......................... 429/19 |

FOREIGN PATENT DOCUMENTS

| | | | |
|---|---|---|---|
| DE | 103 15 255 A1 | | 10/2004 |
| DE | 102005001361 A1 | * | 7/2006 |
| DE | 102005058530 A1 | | 7/2007 |
| DE | 102006024574 A1 | | 11/2007 |
| DE | 102007033864 A1 | | 2/2008 |
| DE | 102006042107 A1 | | 3/2008 |
| DE | 102007039081 A1 | * | 2/2009 |

* cited by examiner

*Primary Examiner* — Ula C Ruddock
*Assistant Examiner* — Daniel Gatewood
(74) *Attorney, Agent, or Firm* — McGlew and Tuttle, P.C.

(57) ABSTRACT

A fuel cell system (1), especially in a motor vehicle, is provided with a fuel cell (2), which generates electric current during the operation from anode gas and cathode gas, with a residual gas burner (3), which reacts anode waste gas with cathode waste gas into burner waste gas during the operation; with an air delivery device (17), which feeds air as cathode gas to the fuel cell (2) via a fuel cell air line (12) during the operation; and with a first heat exchanger (14), which couples a waste gas line (13) removing burner waste gas from the residual gas burner (3) with the fuel cell air line (12) in a heat-transmitting operation. The start-up process of the system (1) is improved with an auxiliary burner (20), which reacts air with a fuel into an auxiliary burner waste gas during the operation; with a bypass air line (24), which is connected on the inlet side to the fuel cell air line (12) between the air delivery device (17) and the first heat exchanger (14) and which is connected to the fuel cell air line (12) on the outlet side between the first heat exchanger (14) and the fuel cell (2). A second heat exchanger (23) couples an auxiliary waste gas line (21) removing auxiliary burner waste gas from the auxiliary burner (20) with the bypass air line (24) in a heat-transmitting manner.

27 Claims, 4 Drawing Sheets

FUEL CELL SYSTEM AND OPERATING PROCESS

CROSS REFERENCE TO RELATED APPLICATIONS

This application claims the benefit of priority under 35 U.S.C. §119 of German Patent Application DE 10 2009 030 236.0 filed Jun. 23, 2009, the entire contents of which are incorporated herein by reference.

FIELD OF THE INVENTION

The present invention pertains to a fuel cell system, especially for use in a motor vehicle or even for stationary applications, e.g., as an additional supply with current and heat, for example, in households or industrial areas. Furthermore, the present invention pertains to a process for operating such a fuel cell system.

BACKGROUND OF THE INVENTION

A fuel cell system, which may be arranged in a motor vehicle as the only electric power supply or as an additional electric power supply, usually comprises a fuel cell, which is formed, as a rule, by a stack of individual fuel cell elements and which reacts an anode waste gas with a cathode waste gas to generate electric current. A residual gas burner, which reacts the waste gases of the fuel cell, i.e., anode waste gas and cathode waste gas while burner waste gas is formed, may be arranged downstream of the fuel cell. To generate a reformate gas, which can be fed as anode gas to the fuel cell, the fuel cell system may be equipped, in addition, with a reformer. The fuel cell operates exothermally in the state in which it operates at normal rating. The reformer likewise operates exothermally during operation at normal rating when it is operating with partial catalytic oxidation of the fuel.

Heat must be supplied to the fuel cell during a cold start of the fuel cell system, during which the individual components are started up from the ambient temperature, in order for the fuel cell to reach its operating temperature. Heat must likewise be supplied for a reformer operating with a catalytic converter in order for the reformer to reach its operating temperature. The fuel cell system has a poor energy efficiency during this start-up process. It will then likewise have comparatively high pollutant emission levels. To make it possible to keep the start-up operation as short as possible in terms of time, it is possible to design the residual gas burner and the reformer for the start-up operation such that the residual gas burner and the reformer generate as much heat as possible during the cold start operation, which can then be used to heat up the components of the system. However, such a design for the start-up operation inevitably leads to incorrect design or overdimensioning for the state of operation at normal rating. This leads especially to a reduction of the energy efficiency of the fuel cell system for operation at normal rating.

SUMMARY OF THE INVENTION

The object of the present invention is to provide an improved embodiment for a fuel cell system of the type mentioned in the introduction or for a corresponding operating process, which is characterized especially by increased efficiency. Furthermore, the possibility of simplified manufacture or simplified formation of variants may be advantageous for the fuel cell system.

The present invention is based on the general idea of equipping the fuel cell system with an auxiliary burner, with which it is possible to preheat the air fed to the fuel cell during the cold start operation. Due to this additional heat source, the fuel cell can be brought to its operating temperature relatively rapidly. The heat-up phase becomes shorter as a result. At the same time, the use of the auxiliary burner makes it possible to design the residual gas burner for the operation of the fuel cell at normal rating, because the auxiliary burner can be switched off at the end of the cold start. As a consequence, improved efficiency is obtained for the operation of the fuel cell system at normal rating.

A first heat exchanger, which makes possible a coupling between the air of the fuel cell and the burner waste gas, i.e., the waste gas of the residual gas burner, in such a way that the media are separated from each other, may be provided to preheat the air of the fuel cell. To utilize the waste gas of the auxiliary heater, i.e., the waste gas of the auxiliary burner to heat the air of the fuel cell, a second heat exchanger may now be provided, which couples the air of the fuel cell with the waste gas of the auxiliary burner in a heat-transmitting manner in such a way that the media are separated from one another. The second heat exchanger is preferably arranged on the air side in a bypass air line, which surrounds the first heat exchanger on the air side. It is thus possible, in principle, to send the total amount of the air of the fuel cell exclusively via the second heat exchanger and to heat it exclusively by the auxiliary burner. This may be especially advantageous when an exothermal reaction is not yet possible in the residual gas burner, e.g., because of lack of anode gas.

Corresponding to an advantageous embodiment, an auxiliary gas line, which removes the auxiliary burner waste gas from the auxiliary burner via the second heat exchanger, may be connected on the outlet side downstream of the first heat exchanger to a waste gas line, which removes the burner waste gas from the residual gas burner via the first heat exchanger. The residual heat of the auxiliary burner waste gas is now fully available downstream of the first heat exchanger, for example, in order to heat an oxidation-type catalytic converter arranged in the waste gas line or to bring same to the operating temperature. The oxidation-type catalytic converter thus becomes available relatively rapidly during the cold start phase.

The auxiliary waste gas line or a branch of the auxiliary waste gas line may be optionally coupled with an end plate of the fuel cell in a heat-transmitting manner. In a usual design of the fuel cell, a stack of individual, plate-shaped fuel cell elements is arranged between two end plates. Anode gas and cathode gas are fed and anode waste gas and cathode waste gas are removed via one of these end plates, the connection plate. The opposite, other end plate, the closing plate, is used to form a block or to stabilize the fuel cell stack. The heating of the fuel cell during the cold start operation begins at the connection plate and migrates over time towards the closing plate. It is possible due to the heat-transmitting coupling of the closing plate with the auxiliary waste gas line to heat up the closing plate already very early, so that the fuel cell is also heated from the closing plate, and the heating will then spread in the direction of the connection plate. The fuel cell is brought as a result considerably more rapidly to its operating temperature, on the one hand. At the same time, it is heated more uniformly.

Furthermore, the waste gas of the auxiliary burner may be optionally used to heat the fuel cell and/or the residual gas burner and/or the first heat exchanger from the outside. In particular, a fuel cell module comprising the fuel cell, residual gas burner and first heat exchanger is heated with the auxiliary waste gas of the auxiliary burner. For example, the waste gas can be fed for this to the fuel cell module in the area of the fuel cell.

In addition or as an alternative, the auxiliary waste gas line or a branch of the auxiliary waste gas line may be coupled with a housing of a reformer in a heat-transmitting manner. It is possible as a result to bring about preheating of the reformer via the auxiliary burner waste gas, as a result of which this [reformer] can reach its operating temperature more rapidly during the cold start operation. The provision of a fuel cell system of a modular design is particularly advantageous here. This comprises at least one fuel cell module and an auxiliary burner module. Furthermore, an air supply module and/or a reformer module may be provided. Moreover, an energy storage module is additionally conceivable. The fuel cell module may have the fuel cell, residual gas burner and first heat exchanger in a heat-insulating jacket of its own. The auxiliary burner module may have the auxiliary burner and second heat exchanger in a heat-insulating jacket of its own. The air supply module may have an air delivery device in an acoustically and/or heat-insulating jacket of its own. The reformer module may have a reformer in a heat-insulating jacket of its own. The energy storage module may have an electric power storage means for supplying electric consumers of the fuel cell system with electric current.

It is obvious that the above-mentioned features, which will also be explained below, can be used not only in the particular combination indicated but in other combinations or alone as well without going beyond the scope of the present invention.

Preferred embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
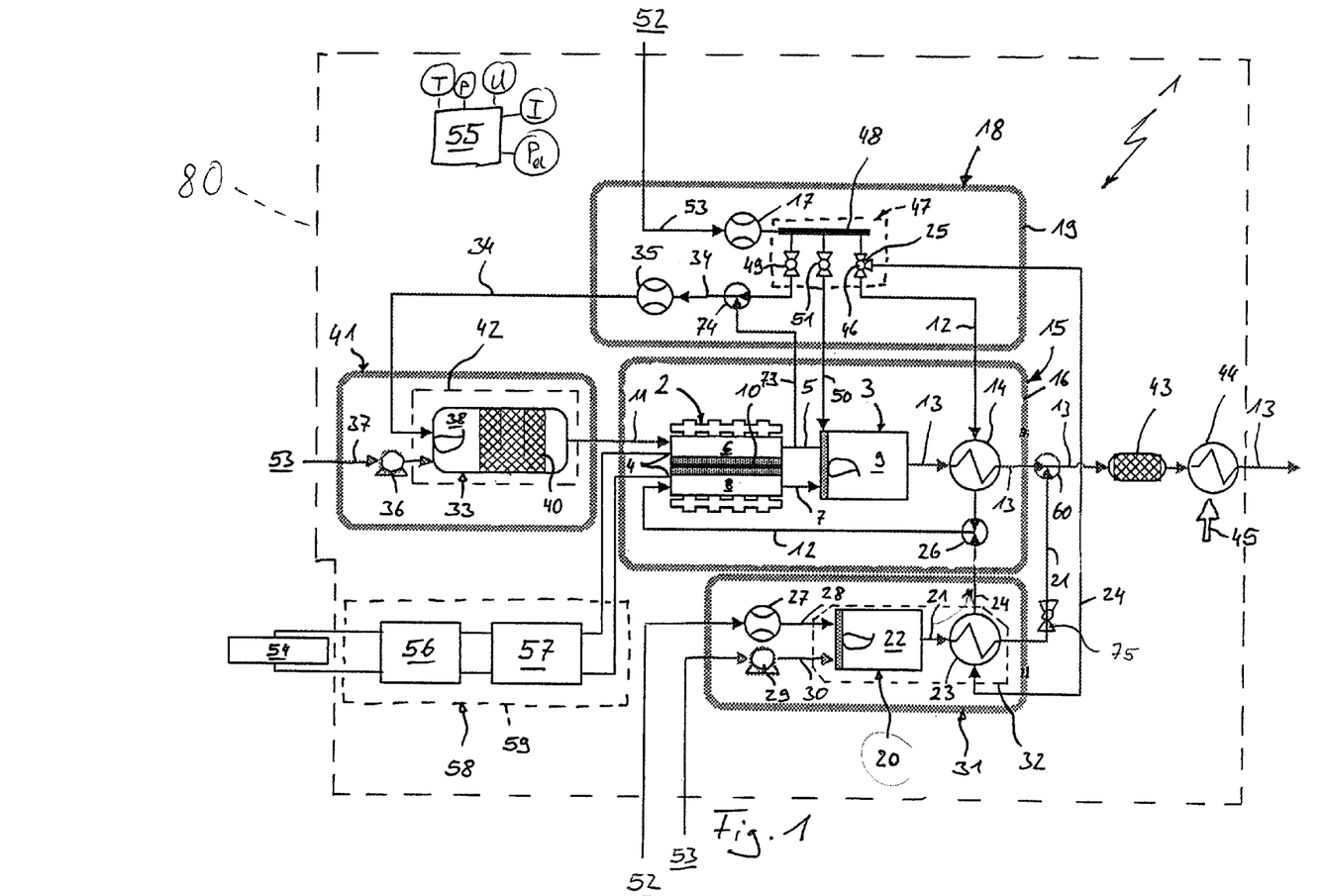
FIG. 1 is a simplified, circuit diagram-like general view of a fuel cell system according to the invention.
Figure 2:
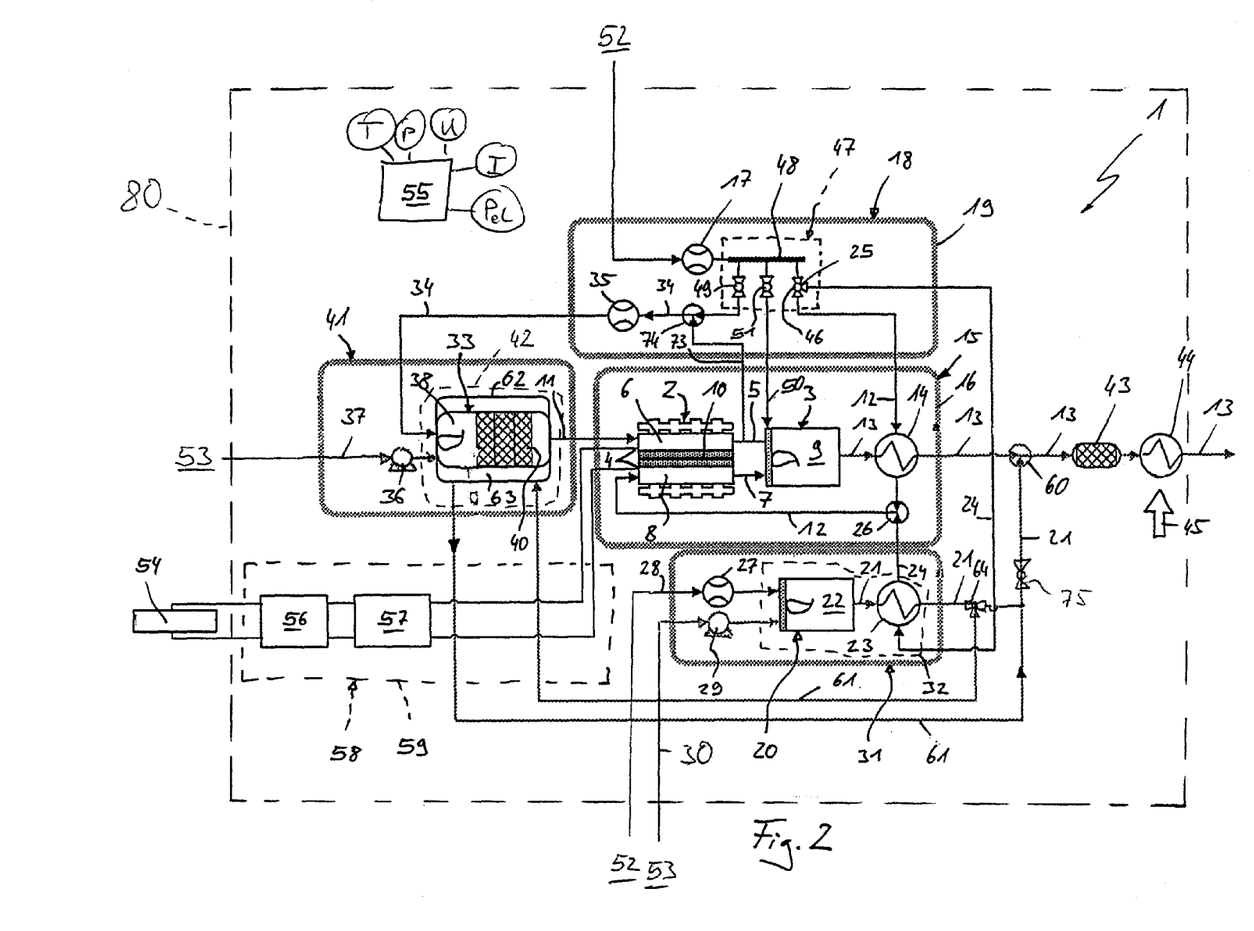
FIG. 2 is a simplified, circuit diagram-like general view of a fuel cell system as in FIG. 1, but for another embodiment according to the invention.
Figure 4:
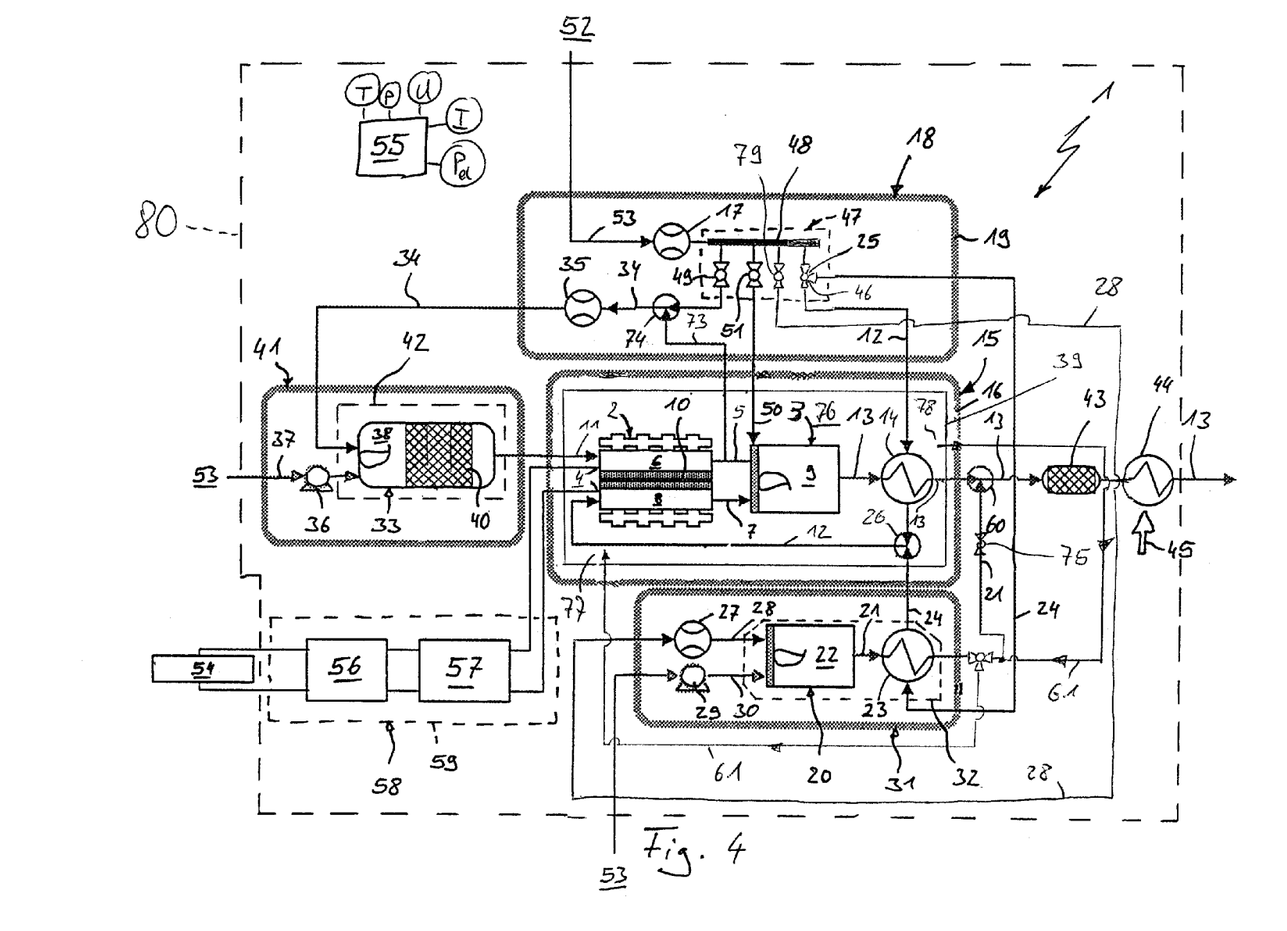
FIG. 4 is a simplified, circuit diagram-like general view of a fuel cell system as in FIGS. 1 and 2, but for another embodiment according to the invention.

Referring to the drawings in particular, corresponding to FIGS. 1, 2 and 4, a fuel cell system 1, which may be arranged in a motor vehicle as a single or additional electric power source, comprises a fuel cell 2 and a residual gas burner 3. The fuel cell system 1 can also be used alternatively for stationary applications. During operation, the fuel cell 2 generates electric power, which can be tapped via electrodes 4, from anode gas and cathode gas. The fuel cell 2 is preferably designed as an SOFC fuel cell. The residual gas burner 3 reacts anode waste gas with cathode waste gas during the operation, while it generates burner waste gas. The reaction may take place with an open flame. A catalytic reaction is likewise conceivable.

An anode waste gas line 5 connects an anode side 6 of the fuel cell 2 to the residual gas burner 3. A cathode waste gas line 7 connects a cathode side 8 of the fuel cell 2 to the residual gas burner 3. The reaction of the fuel cell waste gases will then take place in a combustion chamber 9 of the residual gas burner 3. The residual gas burner 3 may form an integrated structural unit with the fuel cell 2. The anode waste gas line 5 and cathode waste gas line 7 are then internal lines or paths.

An electrolyte 10 separates the anode side 6 from the cathode side 8 in the fuel cell 2. Anode gas is fed to the anode side 6 of the fuel cell 2 via a reformate gas line 11 or an anode gas line 11. Cathode gas is fed to the cathode side 8 of the fuel cell 2 via a fuel cell air line 12. A burner waste gas line 13 removes the burner waste gas generated by the residual gas burner 3 from the residual gas burner 3 or from the combustion chamber 9 thereof. A first heat exchanger 14, which is also integrated into the fuel cell air line 12, is integrated into this burner waste gas line 13. The first heat exchanger 14 establishes a heat-transmitting coupling between the fuel cell air line 12 and the burner waste gas line 13 in such a way that the media are separated from each other. The first heat exchanger 14 may be structurally integrated in the residual gas burner 3.

The fuel cell system 1 is equipped in the example with a fuel cell module 15, which comprises the fuel cell 2, residual gas burner 3 and first heat exchanger 14. Furthermore, this fuel cell module 15 is equipped with a heat-insulating jacket 16, which encloses the components of the fuel cell module 15.

The fuel cell system 1 is equipped, in addition, with an air delivery device 17, which may be, for example, a blower or a compressor or an electrically operated turbocharger or a pump. This air delivery device 17 feeds air as a cathode gas during the operation to the fuel cell 2 via the fuel cell air line 12. The air delivery device 17 is part of an air supply module 18, which has a heat-insulating and/or acoustically insulating jacket 19 of its own, in which the air delivery device 17 is arranged. The air delivery device 17 may be preferably equipped with a filter means, not shown here, in order to filter particles and/or aerosols out of the air being delivered.

The fuel cell system 1 is equipped, moreover, with an auxiliary burner 20, which is configured such that it reacts air with a fuel into auxiliary burner waste gas during the operation. This auxiliary burner waste gas is removed via an auxiliary burner waste gas line 21 or auxiliary waste gas line 21 for short from the auxiliary burner 20 or from a combustion chamber 22 of the auxiliary burner 20. The auxiliary waste gas line 21 preferably contains a shut-off member 75 for uncoupling the auxiliary burner 20 during normal operation of the fuel cell system 1, in which the auxiliary burner 20 is switched off. The shut-off member 75 then acts as a nonreturn lock. A second heat exchanger 23 is integrated in this auxiliary waste gas line 21. In addition, the second heat exchanger 23 is integrated into a bypass air line 24. The second heat exchanger 23 thus establishes a heat-transmitting coupling between the auxiliary waste gas line 21 and the bypass air line 24, in which coupling the media are separated from one another. The second heat exchanger 23 is structurally integrated in the auxiliary burner 20.

The bypass air line 24 bypasses the first heat exchanger 14 on the air side. The bypass air line 24 is connected for this on the inlet side to the fuel cell air line 12 via a tapping site 25 between the air delivery device 17 and the first heat exchanger 14. The bypass air line 24 is connected on the outlet side to the fuel cell air line 12 via an introduction site 26 between the first heat exchanger 14 and the fuel cell 2.

The auxiliary burner 20 is supplied with air via an auxiliary air delivery device 27 and a corresponding air supply line 28. The auxiliary delivery device 27 may be preferably equipped with a filter means, not shown here, in order to filter particles and/or aerosols out of the air being delivered. The air for the auxiliary burner 20 is preferably drawn in from the environment 52 of the fuel cell system. The auxiliary burner 20 is supplied with fuel by means of a fuel delivery device 29 via a corresponding fuel line 30. The fuel may be, for example, any desired hydrocarbon. However, a fuel with which an internal combustion of the vehicle equipped with the fuel cell system 1 is also operated is preferred. Thus, the fuel is, in particular, diesel fuel or biodiesel or heating oil. Gasoline or natural gas or any desired biofuel is conceivable as well. Consequently, the fuel line 30 is preferably connected to a fuel tank 53 of the vehicle, which is not shown more specifically.

The auxiliary burner 20 and the second heat exchanger 23 are part of an auxiliary burner module 31 here, which has a heat-insulating jacket 32 of its own, in which the auxiliary burner 20 and the second heat exchanger 23 are arranged. In addition, the auxiliary air delivery device 27 and the fuel delivery device 29 of the auxiliary burner 20 are part of the auxiliary burner module 31 in the example. However, these parts are arranged outside the corresponding jacket 32.

The fuel cell system 1 is equipped, moreover, in the example being shown with a reformer 33, which reacts air with a fuel during the operation and generates hydrogen-containing and carbon monoxide-containing reformate gas in the process. This reformate gas is fed as anode gas to the anode side 6 of the fuel cell 2 via the reformate gas line 11. A reformer air line 34, which is likewise fed by the air delivery device 17 here, is provided to supply the reformer 33 with reformer air. In addition, another delivery device 35, which will hereinafter be called reformer air delivery device 35, is arranged in the reformer air line 34 downstream of the air delivery device 17 in the embodiment being shown here. The air fed to the reformer 33 can be brought to an increased pressure level by means of this reformer air delivery device 35. In addition, this reformer air delivery device 35 may be designed as a hot gas delivery device. For example, this may be designed in the form of a blower, compressor, electrically operated turbocharger or a pump.

A reformer fuel supply means 36, which feeds a suitable fuel to the reformer 33 via a corresponding fuel line 37, is provided to supply the reformer 33 with fuel. This may again be any desired hydrocarbon. The fuel that is also fed to the internal combustion engine of the vehicle equipped with the fuel cell system 1 is preferred. The fuel line 37 provided for supplying the reformer 33 is correspondingly also advantageously connected to the tank 53 of the vehicle.

Reformer 33 contains a combustion chamber 38 or mixing chamber 38. Reformer 33 contains, in addition, a catalytic converter 40, by means of which the reformate gas can be generated by means of partial oxidation.

Reformer 33 is part of a reformer module 41, which has a heat-insulating jacket 42 of its own or a separate jacket and in which reformer 33 is arranged. The reformer fuel delivery device 36 belongs to the reformer module 41 in the example. However, said delivery device 36 is arranged for this purpose outside the jacket 42 of the reformer module 41.

The burner waste gas line 13 or waste gas line 13 for short contains an oxidation-type catalytic converter 43 for waste gas treatment downstream of the first heat exchanger 14. In addition, a heating heat exchanger 44, which can heat a fluid flow 45 indicated by an arrow during the operation, may be integrated in the waste gas line 13. This may be an air flow 45 that can be fed to the interior space of a vehicle, not shown here. As an alternative, the fluid flow 45 may also be a coolant of a cooling circuit, wherein said cooling circuit contains a heat exchanger for heating an air flow, which can then be fed, for example, to the interior space of a vehicle. The heating heat exchanger 44 is preferably arranged downstream of the oxidation-type catalytic converter 43. The heat possibly released in the oxidation-type catalytic converter 43 during the reaction of pollutants can be utilized as a result to heat the interior space of a vehicle.

The tapping site 25, at which the bypass air line 24 branches off from the fuel cell air line 12, is preferably designed as a valve or is arranged at a valve 46. This valve 46 makes it possible, for example, to split the air flow being delivered by the air delivery device 17 quasi as desired to the section of the fuel cell air line 12 led through the first heat exchanger 14 and the bypass line 24. Valve 46 is preferably part of a valve means 47, which splits the air delivered on the pressure side by the air delivery device 17 via a distributor strip 48 to the fuel cell air line 12 and the reformer air line 34. To control the quantity of air fed to the reformer 33, an additional valve 49 may be provided, which may likewise belong to the valve means 47. Furthermore, a cooling gas line or cooling air line 50, via which cooling air can be fed to the residual gas burner 3, is provided in the example. The cooling air line 50 can be controlled with a valve 51, which likewise belongs to the valve means 47 in the example. The air delivery device 17 likewise draws air from the environment of the fuel cell system 1 via a suction line 53. Valve means 47 is likewise part of the air supply module 18 in the example and is arranged within the corresponding jacket 19.

The valves of valve means 47 and the air delivery device 17, 35 are preferably temperature-controlled or temperature-regulated. For example, valve 49, delivery device 17 and the reformer air delivery device 35 are regulated depending on the temperature of the mixing chamber 38 and/or depending on the temperature of catalytic converter 40. Valve 51 and the air delivery device 17 may be regulated, e.g., depending on the temperature of combustion chamber 9. Valve 46 and the air delivery device 17 may be regulated, for example, depending on the temperature of the cathode side 8. The air delivery device 35 may be regulated, for example, depending on the temperature of the mixing chamber 38 and/or depending on the temperature of catalytic converter 40.

The electric current generated by means of the fuel cell system 1 is advantageously used to supply electric consumers 54 with electric current or electricity. The one electric consumer 54 shown in FIGS. 1 and 2 symbolizes all the electric consumers that can be supplied with electricity by means of the fuel cell system 1. These consumers are, on the one hand, external consumers, i.e., electric consumers 54 of the vehicle, e.g., an air conditioning system, a refrigerator, a coffee maker, a television set, etc., On the other hand, they also include all internal consumers, i.e., all electric consumers 54 of the fuel cell system 1. Electric consumers 54 of the fuel cell system 1 are, e.g., the delivery device 17, 27, 29, 35, 36, valves 46, 49, 51 as well as igniting means, e.g., glow plugs and spark plugs, with which a combustion reaction can be initiated in the residual gas burner 3, in auxiliary burner 20 and in reformer 33. A control means 55, by means of which the individual components of the fuel cell system 1 can be actuated, may also represent an electric consumer 54 of the fuel cell system 1.

Corresponding to the preferred embodiment shown here, the fuel cell system 1 may have, besides, an electric energy storage means 56, which is designed, for example, in the form of a battery. Capacitors are also conceivable as electric energy storage means 56. The energy storage means 56 is used to supply electric consumers of the fuel cell system 1. Furthermore, at least one voltage converter 57 or converter 57 for short may be provided, by means of which a voltage conversion is carried out. For example, a DC/DC converter may be provided. Depending on the particular application, a DC/AC converter may be provided in addition or as an alternative. The corresponding converter 57 converts the voltage between a voltage level of the fuel cell 2, on the one hand, and a voltage level of the electric consumers 54 of the fuel cell system 1 and/or of the energy storage means 56, on the other hand. The energy storage means 56 and optionally also the converter 57 may be accommodated in an energy storage module 58, which has, for example, a housing 59 of its own. Housing 59 may, in particular, also be designed as a separate, heat-insulating and/or electromagnetically insulating jacket, which may hereinafter also be called a jacket 59. An above-mentioned DC/AC converter, which may now be arranged, e.g., between the energy storage means 56 and the corresponding d.c. consumer 54, may be provided especially in case of stationary applications.

The auxiliary waste gas line 21 is connected to the waste gas line 13 via an introduction site 60 in the embodiments being shown here, namely, downstream of the first heat exchanger 14. This introduction site 60 is advantageously positioned such that it is located upstream of the oxidation-type catalytic converter 43. The residual heat of the auxiliary burner waste gases can be utilized as a result to heat the oxidation-type catalytic converter 43. At the same time, the residual heat of the auxiliary burner waste gas may also be used to heat the heating heat exchanger 44.

The auxiliary waste gas line 21 is led from the auxiliary burner 20 directly to the waste gas line 13 in the embodiment shown in FIG. 1. Contrary to this, FIG. 2 shows an embodiment in which the auxiliary waste gas line 21 has a reformer branch 61, which is coupled with a housing 62 of reformer 33 in a heat-transmitting manner. For example, this reformer housing 62 may form a jacket 63, through which auxiliary burner waste gas can flow, as a result of which reformer 33 is heated quasi from the outside. This branch 61 of the auxiliary waste gas line 21 branches off from the auxiliary waste gas line 21 advantageously via a valve 64, which makes it possible to split the auxiliary waste gas flow into a branch 61 and a section of the auxiliary waste gas line 21 leading directly to the waste gas line 13 quasi as desired.

Figure 3:
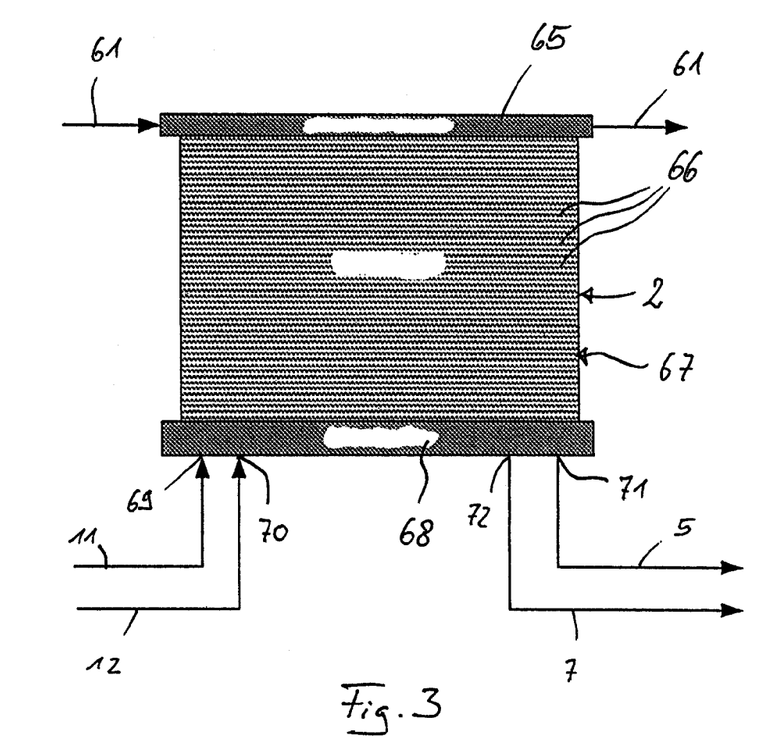
FIG. 3 is a greatly simplified, circuit diagram-like detail view of a fuel cell for another embodiment according to the invention.

In addition or as an alternative, said branch 61 may be coupled according to FIG. 3 with an end plate 65 of the fuel cell 2 in a heat-transmitting manner. It is equally possible to provide two branches 61 in order to make it possible to heat reformer 33 and end plate 65 of the fuel cell 2 independently from one another with the auxiliary waste gas f the auxiliary burner 20.

According to FIG. 3, fuel cell 2 typically has a stack-like design, in which a plurality of plate-like fuel cell elements 66 are stacked one upon the other and form a fuel cell stack 67 or stack 67 as a result. The fuel cell stack 67 is closed at its ends by two end plates, namely, by said end plate 65 as well as by another end plate 68. This additional end plate 68 has in the example an anode gas port 69, to which the anode gas line 11 or reformate gas line 11 is connected; a cathode gas inlet 70, to which the cathode gas line 12 or fuel cell air line 12 is connected; an anode waste gas outlet 71, to which the anode waste gas line 5 is connected; as well as a cathode waste gas outlet 72, to which the cathode waste gas line 7 is connected. Since all educt ports are thus arranged at this additional end plate 68, this may also be called a port plate 68. Contrary to this, the other end plate 65 forms only a closure of the fuel cell stack 67, so that it may also be called a closing plate 65.

An additional jacket 39, which has especially a gas-tight design, is arranged in the heat-insulating jacket 16 of the fuel cell module 15 in the embodiment shown in FIG. 4. This inner jacket 39 may likewise have a heat-insulating action. It is likewise conceivable to design the outer jacket 16 as a gas-tight jacket. Furthermore, one jacket 16, 39 may be sufficient if it is of a heat-insulating and gas-tight design. The aforementioned branch 61 of the auxiliary waste gas line 21 is connected to an interior space 76 of the fuel cell module 15 enclosed by the inner jacket 39 in the embodiment shown in FIG. 4. Branch 61 opens at 77 at an inlet site into said interior space 67 and exits at 78 at an outlet site located at a spaced location therefrom from the interior space 76. The fuel cell module 15 can thus be heated as a result with the auxiliary burner waste gas. In particular, this can be combined with the heating of fuel cell 2. For example, the auxiliary burner waste gas may be led at first via branch 61 to closing plate 65 and discharged from this into the interior space 76 in order to be removed from interior space 76 via the outlet site 78.

Furthermore, fuel cell system 1 is equipped in the preferred embodiments shown here with a recirculation line 73, which is connected to the anode waste gas line 5 on the inlet side and via an introduction site 74 to the reformer air line 34 on the outlet side, namely, upstream of the reformer air delivery device 35. Since the returned anode waste gas may have comparatively high temperatures during the operation of the fuel cell system 1, the reformer air delivery device 35 is advantageously designed for admission of hot gases, and these gases may, besides, also be toxic and/or explosive.

Valve means 47 is designed in the example to split the air drawn in by the air delivery device 17 on the pressure side among fuel cell air line 12, bypass air line 24, cooling air line 50 and reformer air line 34.

FIG. 4 shows, in addition, an embodiment in which the air delivery device 17 is used, in addition, to supply the auxiliary burner 20 with air via valve means 47. The auxiliary burner air line 28 may be connected for this purpose to the distributor strip 48 via another valve 79. As an alternative, the auxiliary air delivery device 27 may also be omitted in the auxiliary burner air line 28.

The control means 55 is advantageously designed or programmed such that it can perform the following operating process. It may be connected for this purpose to a sensor system, not designated more specifically, which may have a plurality of sensors for temperatures T, pressures p, voltages U, currents I and electric power $P_{el}$.

During a start-up operation of the fuel cell system 1, especially during a cold start, the auxiliary burner waste gas is used to preheat the fuel cell air, which is led through the bypass air line 24 for this purpose. At the same time, the auxiliary burner waste gas can be used during the start-up operation to preheat the oxidation-type catalytic converter 43. The auxiliary burner waste gas can be additionally used to preheat reformer 33 in the embodiment shown in FIG. 2. As an alternative or in addition, the auxiliary burner waste gas may also be used to preheat end plate 65 of the fuel cell 2 according to the embodiment shown in FIG. 3. As an alternative or in addition, the auxiliary burner waste gas may also be used to preheat the entire fuel cell module 15 according to the embodiment shown in FIG. 4. As soon as the start-up operation is ended, the auxiliary burner 20 may be switched off. In particular, auxiliary burner 20 is switched off during operation of the fuel cell system 1 at normal rating.

Reformer 33 starts as a burner during the start-up operation, which can be embodied especially by a superstoichiometric supply with air. After reaching the activation temperature of catalytic converter 40 of reformer 33, there is a changeover from burner operation to reformer operation. The air ratio is set for this to a suitable substoichiometric value. During the start-up operation of the fuel cell system 1, reformer 33 starts with a comparatively low reformer capacity, which corresponds, e.g., to about one third the reformer capacity during operation at normal rating. The air ratio in the reformer is still comparatively high at the beginning in order to keep the percentages of carbon monoxide and residual hydrocarbons in the reformate gas low. As soon as the fuel cell temperature has reached a minimum operating temperature, the reformer capacity is gradually increased, the air ratio is reduced at the same time in order to increase the percentages of hydrogen and carbon monoxide in the reformate gas.

Reformer 33 may be designed as a self-starting reformer 33, for which it is equipped especially with a suitable igniting member, not shown here. It can be operated as a burner in order to reach the activation temperature of its catalytic converter 40. A reformate gas with a high percentage of hydrogen and carbon monoxide can be generated in reformer 33 or at the catalytic converter 40 thereof in the reformer operation by a substoichiometric fuel-to-air ratio.

With the auxiliary burner 20 switched off, the bypass air line 24 may be able to be used to regulate the temperature of the fuel cell 2. Since the bypass air line 24 bypasses the first heat exchanger 14, the air being transported therein is comparatively cold, at least relative to the air passed through the first heat exchanger 14.

The auxiliary burner 20 may be used, e.g., to carry out parking heater operation especially when the fuel cell system 1 is switched off. The hot auxiliary waste gases generated by means of the auxiliary burner 20 heat the heating heat exchanger 44 and make heating of the air flow 45 possible thereby.

The energy storage means 56 may be used, on the one hand, to operate the electric consumers 54 of the fuel cell system 1, especially the diverse delivery device for supplying media, igniting members, heating elements and control device 55. This may be necessary, e.g., for the start-up operation, as long as the fuel cell 2 itself does not generate any electric current. On the other hand, electric energy generated by the fuel cell system 1 can be fed into the energy storage means 56. For example, energy storage means 56 can be charged in a simple manner as a result. Should the dynamics of the external electric consumers, e.g., an electrically operated compressor of an air-conditioning system, have a more rapid response than the dynamics of the fuel cell system 1, energy storage means 56 may act, besides, as a buffer system. This buffer system can supply the need for additional electric energy for the external consumer 54 in question. On the other hand, the buffer system can absorb excess electric energy of the fuel cell system 1 in order to eliminate the need for an emergency stop for the fuel cell system 1 in case of a so-called "load shedding," i.e., an abrupt switching off of major electric consumers 54.

Provisions may be made in another embodiment for coupling the heat-insulating jackets 16, 42 and 32 with one another and/or to attach these jackets to one another. The goal is to maintain a possibly equal temperature level in said jackets 16, 32, 42 or in the corresponding modules 15, 31 and 41.

In addition, a box 80, in which the entire fuel cell system 1 is accommodated, is indicated in the embodiments according to FIGS. 1, 2 and 4. This box 80 may form a common housing for the components of system 1, which simplifies the mounting of the system in the particular mobile or stationary application. For example, system 1 may be integrated in this box 80 in a vehicle or attached to a carrier or to a wall or to a base in case of a stationary application.

While specific embodiments of the invention have been described in detail to illustrate the application of the principles of the invention, it will be understood that the invention may be embodied otherwise without departing from such principles.

What is claimed is:

1. A fuel cell system comprising:
   a fuel cell generating electric current during operation from anode gas and cathode gas;
   a residual gas burner reacting anode waste gas with cathode waste gas during the operation;
   a fuel cell air line;
   an air delivery device feeding air as a cathode gas to the fuel cell during the operation via said fuel cell air line;
   a waste gas line removing burner waste gas from the residual gas burner;
   a first heat exchanger coupling the waste gas line with the fuel cell air line in a heat-transferring manner;
   an auxiliary burner reacting air with a fuel into auxiliary burner waste gas during the operation;
   a bypass air line connected to the fuel cell air line on an inlet side between the air delivery device and the first heat exchanger and connected to the fuel cell air line on an outlet side between the first heat exchanger and the fuel cell;
   an auxiliary waste gas line, removing auxiliary burner waste gas from the auxiliary burner; and
   a second heat exchanger coupling the auxiliary waste gas line with the bypass air line in a heat-transferring manner.

2. A fuel cell system in accordance with claim 1, wherein the auxiliary waste gas line is connected to the waste gas line on an outlet side downstream of the first heat exchanger.

3. A fuel cell system in accordance with claim 1, wherein the auxiliary waste gas line contains a shut-off member, which prevents or hinders the return flow of waste gas of the residual gas burner to the auxiliary burner at least while the auxiliary burner is switched off.

4. A fuel cell system in accordance claim 1, further comprising an oxidation-type catalytic converter integrated in the waste gas line downstream of the first heat exchanger, wherein the auxiliary waste gas line is connected to the waste gas line on an outlet side between the oxidation-type catalytic converter and the first heat exchanger.

5. A fuel cell system in accordance claim 1, wherein the auxiliary waste gas line or a branch of the auxiliary waste gas line is coupled with an end plate of the fuel cell in a heat-transmitting manner.

6. A fuel cell system in accordance claim 1, further comprising: a reformer, which reacts air with a fuel during the operation into reformate gas, which reformate gas is fed to the fuel cell as an anode gas, wherein the auxiliary waste gas line or a branch of the auxiliary waste gas line is coupled in a heat-transmitting manner with a housing of the reformer.

7. A fuel cell system in accordance claim 1, further comprising:
   a reformer air line; and
   a reformer, which reacts air with a fuel during the operation into reformate gas, which reformate gas is fed to the fuel cell as an anode gas, wherein the air delivery device feeds air during the operation via the reformer air line to the reformer.

8. A fuel cell system in accordance with claim 7, further comprising a reformer air delivery device arranged in reformer air line.

9. A fuel cell system in accordance with claim 8, further comprising: a recirculating line, which returns anode waste gas into the reformer air line upstream of the reformer air delivery device.

10. A fuel cell system in accordance claim 1, further comprising: a valve splitting air drawn in by the air delivery device, on a pressure side, into the fuel cell air line and the bypass air line and/or a cooling air line supplying cooling air to the residual gas burner and/or to a reformer air line for supplying a reformer with air.

11. A fuel cell system in accordance claim 1, wherein a heating heat exchanger heating an air flow, which is fed to at least one of an interior space of a vehicle or another heat consumer, is integrated in the waste gas line downstream of an oxidation-type catalytic converter.

12. A fuel cell system in accordance claim 1, further comprising an electric energy storage means for storing electricity from electric current generated by the fuel cell and supplying electric consumers of the fuel cell system with electric current.

13. A fuel cell system in accordance claim 12, further comprising
a voltage converter for voltage conversion between a voltage level of the fuel cell, on the one hand, and a voltage level of the electric consumers of the fuel cell system and/or of the electric energy storage means of the fuel cell system, on the other hand, wherein the voltage converter comprises a DC/DC converter or as a DC/AC converter.

14. A fuel cell system in accordance claim 1, further comprising a fuel cell module comprising a heat-insulating jacket with the fuel cell, the residual gas burner and the first heat exchanger therein.

15. A fuel cell system in accordance with claim 14, wherein the auxiliary waste gas line or a branch of the auxiliary waste gas line is coupled with the fuel cell module in a heat-transmitting manner.

16. A fuel cell system in accordance claim 15, further comprising:
an auxiliary air delivery device for supplying air for the auxiliary burner and/or a fuel supply for supplying the auxiliary burner with fuel;
an auxiliary burner module, which has the auxiliary burner, the second heat exchanger in an auxiliary burner module heat-insulating jacket, and the auxiliary air delivery device and/or the fuel supply.

17. A fuel cell system in accordance claim 1, further comprising an air supply module, which has the air delivery device in an acoustically and/or heat-insulating an air supply module jacket, wherein the air supply module includes a valve and/or reformer air delivery device.

18. A fuel cell system in accordance claim 1, further comprising a reformer module with a reformer module heat-insulating jacket and a reformer, which reacts air with a fuel during the operation into a reformate gas, which is fed to the fuel cell.

19. A fuel cell system in accordance claim 1, further comprising an energy storage module with a heat-insulating and/or electromagnetically insulating energy storage module jacket, an electric energy storage means for supplying electric consumers of the fuel cell system with electric current, a voltage converter for voltage conversion between a voltage level of the fuel cell, on the one hand, and a voltage level of the electric consumers of the fuel cell system and/or of the electric energy storage means, on the other hand.

20. A fuel cell system in accordance claim 1, further comprising an auxiliary burner air line wherein the air delivery device feeds air to the auxiliary burner via an auxiliary burner air line.

21. A fuel cell system in accordance claim 1, further comprising:
a control means for operating the fuel cell system, the control means being designed and/or programmed such that the control means can operate the fuel cell system including to at least one of:
use the auxiliary burner waste gas to preheat fuel cell air fed through the bypass air line during a start-up operation of the fuel cell system;
use the auxiliary burner waste gas to preheat an oxidation-type catalytic converter and/or reformer and/or an end plate and/or fuel cell during the start-up operation;
switch off the auxiliary burner during operation of the fuel cell system at normal rating; and
use the auxiliary burner to carry out a parking heater operation when the fuel cell system is switched off.

22. A fuel cell system in accordance claim 1, wherein said second heat exchanger receives said air via said bypass line and said second heat exchanger receives said auxiliary burner waste gas via said auxiliary waste gas line.

23. A fuel cell system in accordance with claim 22, wherein said bypass line bypasses said first heat exchanger, said first heat exchanger receiving said burner waste gas via said waste gas line, said first heat exchanger receiving said air via a portion of said fuel cell air line.

24. A fuel cell system comprising:
a fuel cell for generating electric current from anode gas and cathode gas;
a residual gas burner for reacting anode waste gas with cathode waste gas;
a fuel cell air line comprising a first fuel cell air line portion and a second fuel cell air line portion;
an air delivery device feeding air as a cathode gas to the fuel cell via said fuel cell air line;
a waste gas line removing burner waste gas from the residual gas burner;
a first heat exchanger connected to said waste gas line and said fuel cell air line;
an auxiliary burner reacting air with a fuel into auxiliary burner waste gas;
a bypass air line comprising an inlet side and an outlet side, said first fuel cell air line portion extending between said air delivery device and said first exchanger, said second fuel cell air line portion extending between said first heat exchanger and said fuel cell, said inlet side of said bypass line being connected to said first fuel cell air line portion, said outlet side of said bypass line being connected to said second fuel cell air line portion;
an auxiliary waste gas line, removing auxiliary burner waste gas from the auxiliary burner; and
a second heat exchanger coupling the auxiliary waste gas line with the bypass air line in a heat-transferring manner.

25. A fuel cell system in accordance claim 24, wherein said second heat exchanger receives said air via said bypass line and said second heat exchanger receives said auxiliary burner waste gas via said auxiliary waste gas line, said bypass line bypassing said first heat exchanger, said first heat exchanger receiving said burner waste gas via said waste gas line, said first heat exchanger receiving said air via said first fuel cell air line portion.

26. A fuel cell system comprising:
a fuel cell generating electric current from anode gas and cathode gas;
a residual gas burner reacting anode waste gas with cathode waste gas;
a fuel cell air line;
an air delivery device feeding air as a cathode gas to the fuel cell via said fuel cell air line;
a waste gas line removing burner waste gas from the residual gas burner;
a first heat exchanger connected to said waste gas line and said fuel cell air line;
an auxiliary burner reacting air with a fuel into auxiliary burner waste gas;
a bypass air line comprising an inlet side and an outlet side, said inlet side of said bypass line being connected to said fuel cell air line at a first bypass air line and fuel cell air line connecting position, said outlet side of said bypass line being connected to said fuel cell air line at a second bypass air line and fuel cell air line connecting position, said first bypass air line and fuel cell air line connecting position being located at a spaced location from said second bypass air line and fuel cell air line connecting position;
an auxiliary waste gas line, removing auxiliary burner waste gas from the auxiliary burner; and
a second heat exchanger coupling the auxiliary waste gas line with the bypass air line in a heat-transferring manner.

27. A fuel cell system in accordance claim 26, wherein said second heat exchanger receives said air via said bypass line and said second heat exchanger receives said auxiliary burner waste gas via said auxiliary waste gas line, said first bypass air line and fuel cell air line connecting position being defined by said inlet side of said bypass line and a first portion of said fuel cell air line, said first portion of said fuel cell air line extending between said air delivery device and said first heat exchanger, said second bypass air line and fuel cell air line connecting position being defined by said outlet side of said bypass line and a second portion of said fuel cell air line, said second portion of said fuel cell air line extending between said first heat exchanger and said fuel cell, said bypass line bypassing said first heat exchanger, said first heat exchanger receiving said burner waste gas via said waste gas line, said first heat exchanger receiving said air via said first portion of said fuel cell air line.

* * * * *